March 8, 1966 F. H. BARNETT 3,239,084
REFUSE COLLECTING VEHICLE
Filed Oct. 30, 1962 3 Sheets-Sheet 1
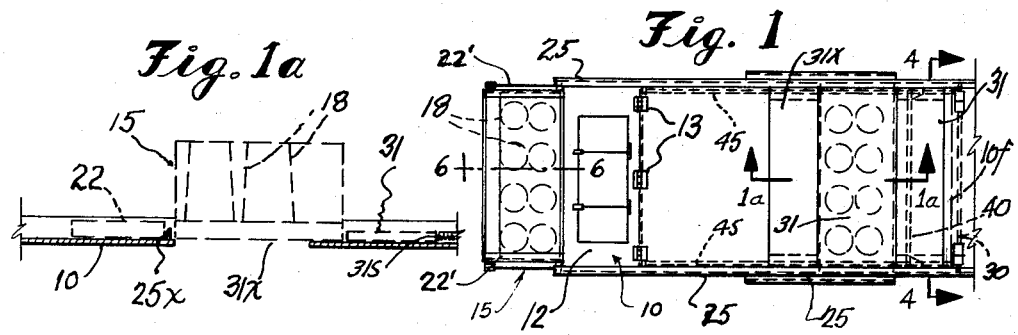
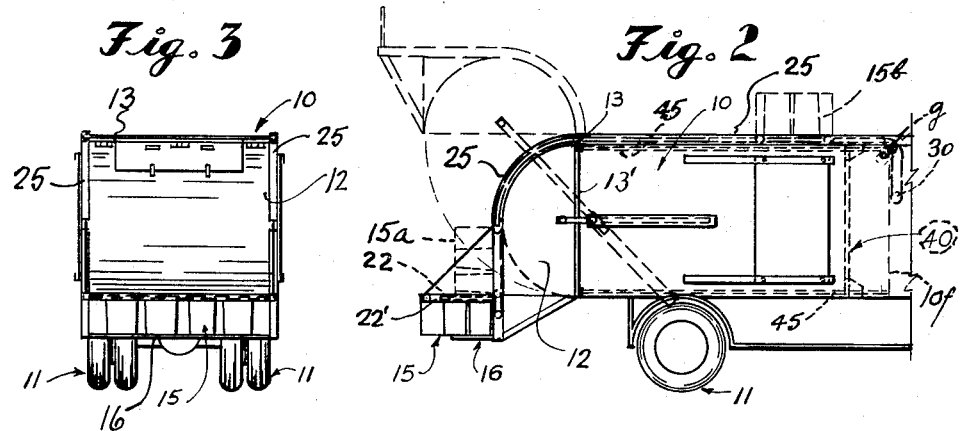
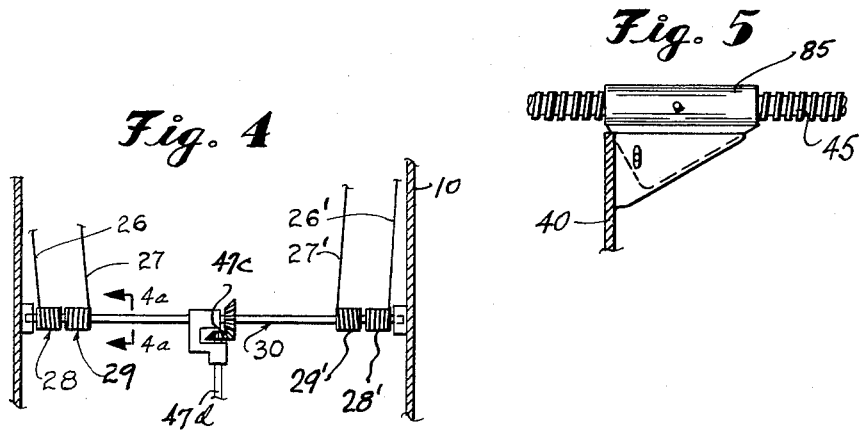
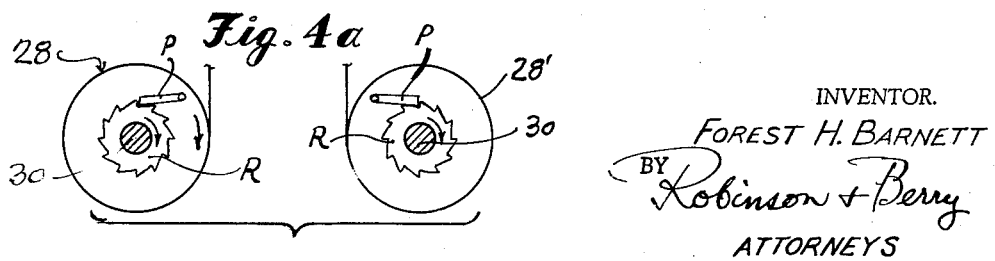
INVENTOR.
FOREST H. BARNETT
BY Robinson + Berry
ATTORNEYS March 8, 1966  F. H. BARNETT  3,239,084
REFUSE COLLECTING VEHICLE
Filed Oct. 30, 1962  3 Sheets-Sheet 2
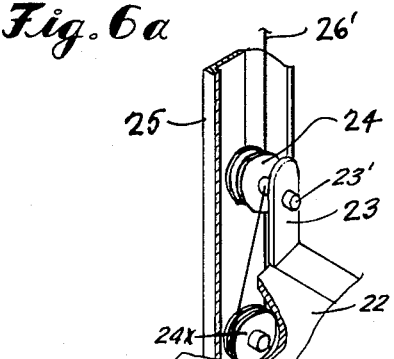
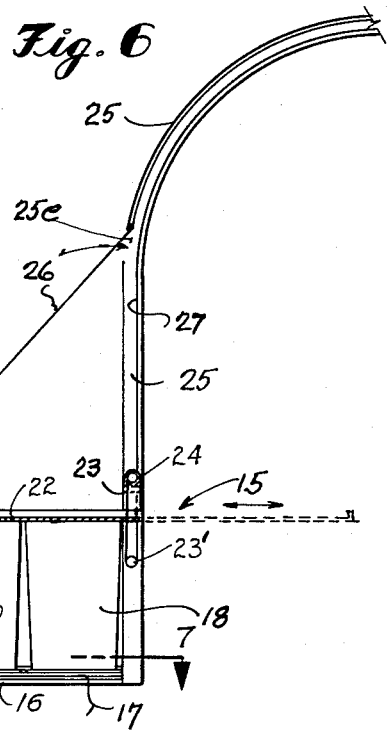
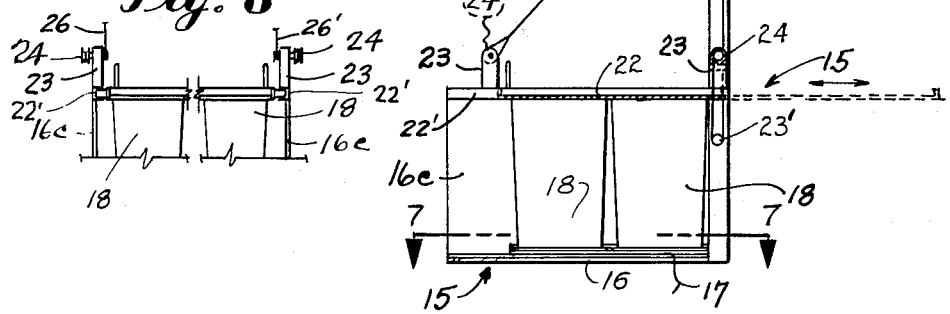
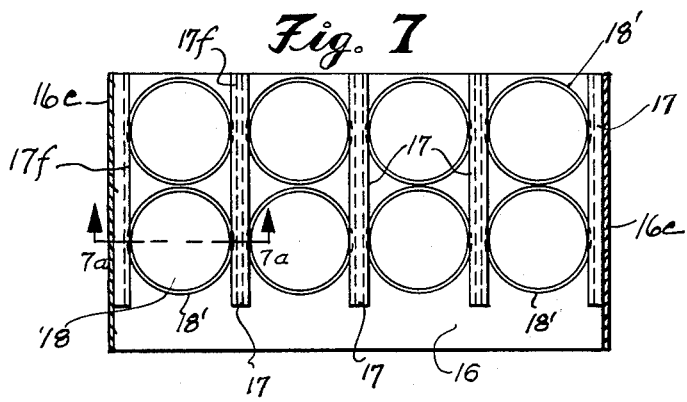
INVENTOR.
FOREST H. BARNETT
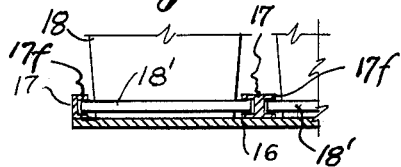
ATTORNEYS

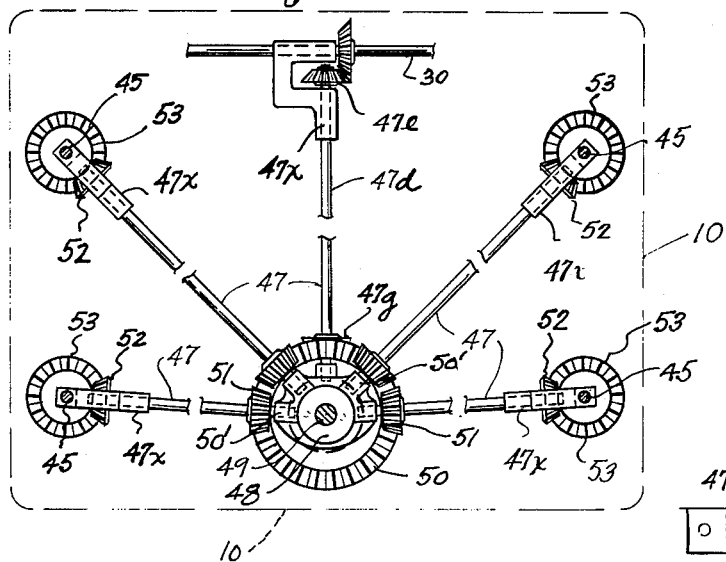
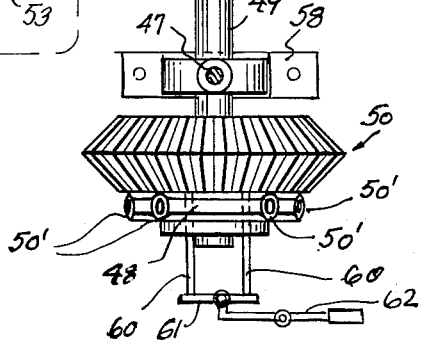
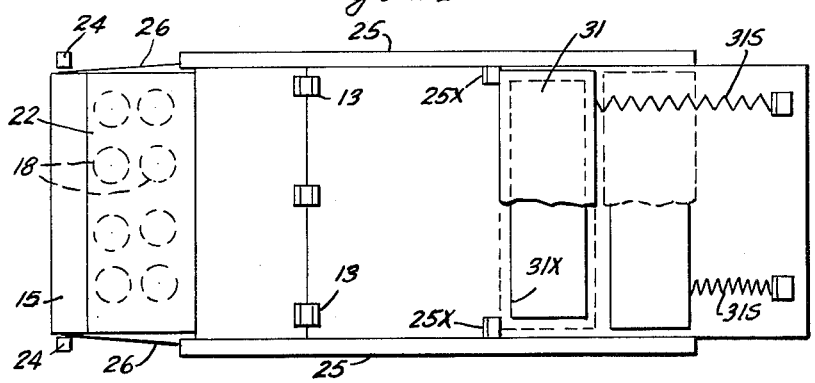

United States Patent Office 3,239,084
Patented Mar. 8, 1966

3,239,084
REFUSE COLLECTING VEHICLE
Forest H. Barnett, 625 S. Trafton St., Tacoma, Wash.
Filed Oct. 30, 1962, Ser. No. 234,145
5 Claims. (Cl. 214—303)

This invention relates to mobile, motorized refuse carriers or trucks. More particularly it has reference to improvements that are designed to better adapt such vehicles to meet their requirements and to attain the most advantages of their use both in cities and in rural districts. The present invention has reference especially to improvements in those motorized carriers of automobile truck types, usually designated as "garbage trucks," employing either rear end or side loading facilities and which are equipped with mechanical can pick up, can dumping and load packing mechanisms.

It is the principal object of this invention to provide improvements in refuse carriers or garbage trucks of the character above stated that combine therein the advantages of maximum packing capacity along with improved mechanical means for loading, load packing and unloading under the control of workmen using them.

It is now generally recognized that it is most advantageous to design refuse carriers of this general type and character for rear end loading, and for the packing of the bodies with refuse loaded therein from their forward toward their rearward ends. Therefore, it has been one of the principal objects of this invention to provide a truck with improved facilities for the rear end pick-up of garbage containing cans; for the mechanical lifting and conveyance of the picked up cans along the top to the forward end portion of the body and the dumping of their contents into the closed carrier body for rearward packing therein. It is also an object of this invention to equip the carrier or truck with additional facilities that render it desirable and more practical for use when three workmen are employed in the refuse pick-up and loading operation.

Another object of the invention is to provide a garbage pick-up truck with a can loading, lifting and dumping platform at the rear end thereof onto which platform filled cans as picked up may be placed for mechanical dumping; which platform is characterized by the provision of means thereon for holding a plurality of cans for their lifting and forward advancement to the dumping position and for their simultaneous discharge of contained garbage therefrom into the vehicle body, and to finally effect their return immediately after dumping, to the rear end of the truck body for exchange with filled cans, in the normal can pick-up operation by attendants.

Another object of the invention resides in the provision in conjunction with the can lifting platform, of a sliding closure plate for covering the group of cans as placed on the platform and as moved and inverted to the dumping opening of the body; to provide the vehicle body with a receiving opening that also has a sliding closure plate and to provide means for its automatic actuation between closed and open positions with the movement of the platform and inverted cans to and from can dumping position.

Yet another object of the invention is to provide novel and practical powered cable winding mechanisms for effecting and controlling the lifting, dumping and return movements of the loading platform; for the opening and closing action of the rear end closure of the truck body for load discharge and in the particular combination of power devices for the rearward packing of the refuse after being dumped from the cans into the body.

Still further objects and advantages of the invention resides in the details of construction of the various parts of the apparatus and in their assembly and mode of use in the present operation, as will hereinafter be fully described.

In accomplishing the above mentioned and other objects and advantages of the invention that will become apparent as the specification progresses, I have provided the improved details of construction, the preferred forms of which are illustrated in the accompanying drawings, wherein:

FIG. 1 is a top or plan view of the body portion of a "refuse carrier" or "garbage truck," embodying the improvements of the present invention therein for rear end loading.

FIG. 1a is an enlarged fragmental sectional detail taken on line 1a—1a in FIG. 1, showing the top wall receiving opening of the body and the position of cans for discharging their contents therethrough into the body.

FIG. 2 is a side view of the vehicle body as shown in FIG. 1, with the rear end can loading and dumping platform in can receiving position.

FIG. 3 is a rear end elevation of the vehicle, as shown in FIG. 2.

FIG. 4 is an enlarged horizontal sectional view, taken substantially on line 4—4 in FIG. 1, showing the cable winding shaft with cable drums and cables as extended therefrom for their connection with the can lifting and dumping platform as normally located at the rear end of the truck body.

FIG. 4a is an diagramatic enlargement showing the relationship of the two drum driving pawl and ratchet connections with the driving shaft.

FIG. 5 is an enlarged fragmental view showing a portion of one of the packing plate actuating worm shafts and the plate moving nut as applied thereto.

FIG. 6 is an enlarged sectional view, taken on line 6—6 on FIG. 1, showing the can lifting and dumping platform; the arrangement of can holding means and can cover plate, and the attachment of a pair of lifting cables to one end of the platform frame structure.

FIG. 6a is an enlarged detail showing in perspective, one of the platform lifting cables and the manner of its connection with the platform.

FIG. 7 is a horizontal section, taken on line 7—7 in FIG. 6, showing the mode of assembly of garbage cans on the dumping platform between the can holding guides as applied to the platform.

FIG. 7a is an enlarged sectional detail taken on line 7a—7a in FIG. 7.

FIG. 8 is a view showing in elevation, the upper end portions of cans as mounted on the suspended dumping platform in FIG. 6, the medial portion being broken away.

FIG. 9 is a forward end elevation of the load receiving body, showing the arrangement therein of the packing plate actuating shafts, the cable winding shaft and their driving gears.

FIG. 10 is a top view of the shiftable, double faced gear employed for the driving mechanism of the longitudinal and radial shafts shown in FIG. 9.

FIG. 11 is an enlarged top view of the vehicle showing the refuse receiving opening and its cover plate.

Before giving a detailed description of the present refuse truck, the following brief disclosure of its intended mode of operation and use, as shown in FIGS. 1, 2 and 3 will be given, thus to provide for better understanding of the description that is to follow: It is the intent that in the use of the present truck, all garbage cans used for the pick-up of refuse from alleys or streets by the workmen or collectors shall be of predetermined and identical dimensions and, as individually picked up, will be positioned on a horizontal dumping platform that is normally suspended at the rear of the garbage truck body, in that position best shown in FIGS. 2 and 6. When the platform has been loaded with the intended number of cans as, for example as seen in FIG. 7, they may then be simultaneously moved by the lifting of the platform to the top of the truck body and advanced along its top wall to a receiving opening which is provided therein adjacent its forward end. As the initial lifting force is applied, the platform is first caused to be tilted in such manner that all cans as held thereon will be tilted forwardly to a horizontal position, as seen in dash lines at the rear end of the body in FIG. 2. Then, as the platform continues to travel upwardly and forwardly over the rounded rear end closure of the body, they will be fully inverted by the platform with its forward travel.

During the forward or dumping travel of the inverted cans with the platform, their contents is retained therein by a cover or closure plate that is mounted on and is movable with the platform structure. As the inverted cans closely approach the dumping position, a lid that is slidably mounted on the top wall of the truck to normally cover the refuse receiving opening therein, is engaged by the forwardly moving platform structure and is caused to be slid forwardly thereby to its open position. With this engaging of the lid, the can cover plate, which is carried by the platform, engages a stop on the body and is thereby caused to uncover the cans as they are moved over the body wall opening, thus allowing their contents to be discharged into the truck body. The platform, with the inverted and emptied cans still holdingly secured thereto, is then returned rearwardly along the same path to the normal loading position as in FIG. 2. These empty cans may then be individually exchanged for filled cans as the collection of refuse continues.

Before any filled can is placed for dumping on the loading platform, as in FIG. 2, its usual lid or cover is removed therefrom, then in the placement of the filled can on the dumping platform, it is slid beneath and covered by the cover plate that is common to all and which plate is slidably retained on the platform structure, as in FIG. 6.

Referring now more in detail to the drawings and particularly to the rear end loading truck of FIG. 1:

The carrier or garbage truck as therein shown, comprises a closed, horizontally disposed, tubular body 10 of that substantially rectangular cross-sectional form indicated in end view in FIG. 3; the body 10, as therein shown, being suitably supported on a truck chassis. The truck may be powered by the usual engine, not herein shown, and the vehicle chassis may be mounted by suitable wheels, herein designated by numeral 11. In the present arrangement, the body 10 overhangs the rear wheels of the chassis and is open at its rear end but fitted with a semicylindrical closure 12 that is hinged across its top edge to the body as at 13 in FIGS. 1 and 2 for rearward and upward arcuate swinging between body opening and closing positions. This semicylindrical end closure 12 is closed by vertical walls at opposite sides of the body; is axially horizontally disposed, and at its side edges it closely fits the open rear end of the tubular body 10 in vertical joints 13'. Near its forward end the body 10 is closed by a fixed transverse wall 10f.

Suspended from the rear end closure 12, as best understood by reference to FIGS. 1, 3 and 6, is the can loading and dumping platform structure designated in its entirety by numeral 15. This platform structure comprises a rectangular and normally horizontal bottom plate 16 that is suspended, for loading, in that horizontal position in which it is shown best in FIGS. 6 and 7. It is shown in FIGS. 7 and 7a that this platform plate 16 is equipped on its top side with a succession of can retaining bars 17 fixed thereon in parallel relationship and in predetermined lateral spacing; each bar being formed with projecting can holding flanges 17f along its top and opposite side edges. All garbage collecting cans 18 are of the special design or formation herein shown and are of like dimensions. They are slightly downwardly conically tapered for slidable reception at their lower ends between adjacent bars 17 as in FIG. 7 and are formed about their lower ends with circumferential retaining bands 18' that will be caused to holdingly engage against the under surfaces of flanges 17f of adjacent bars as seen in FIG. 7a, thus to secure the cans to the platform for the can upending and dumping operation, as will presently be fully explained. At their upper ends, the diameters of the cans 18 is such that as arranged on the platform, they are peripherally engaged, as seen in FIG. 6. The open ends of cans placed on the platform will be closely beneath a can cover plate 22 that is slidably contained at its opposite side edges in horizontal, channeled guideways 22' applied across the top edges of the opposite ends of the platform structure 15, as seen in FIGS. 6 and 8.

It is intended that two cans 18 may be received between adjacent bars 17, as shown in FIG. 7. As the cans 18 are collected by the workman and are slid into place on the platform 16, their open upper ends are moved beneath the closely overlying closure plate 22 as mounted horizontally and slidably in the guides 22' that are rigidly fixed to the dumping structure 15, as seen in FIG. 6, for its sliding movement between can covering and the can uncovering position as indicated in dotted lines in that view.

The platform frame structure 15 as rigidly constructed comprises the bottom platform or plate 16; opposite end wall plates 16c which at their top edges mount the guide rails 22' in which the side edges of cover plate 22 are slidably contained. This platform structure is provided at the top of its opposite ends, at front and rear corners, with rigidly fixed, hangers 23 as seen in FIGS. 6 and 8. At the outside of their upper ends these hangers are each equipped with a horizontal roller 24, as in FIG. 6a, positioned for reception in and for guided travel in channeled guide rails 25 that are applied to and which extend upwardly along opposite side edges of the rear end of the body closure 12 and then curve upwardly and forwardly to continue along its top corner edges to the forward end portion of the body 10 as in FIG. 2.

The moving of the platform structure 15 for can lifting and dumping is accomplished by the cable winding means shown in FIG. 4, which is located within the forward end portion of the body 10, across its top portion forwardly of wall 10f. This cable winding mechanism includes two pairs of cable winding drums located, respectively, near opposite side walls of body 10 for controlled rotation on a horizontal drive shaft 30. The drums are of the same diameter; the pair at one side being designated by reference numerals 28 and 29 and those at the other side by numerals 28' and 29'. Paired cables 26 and 26' are wound on and extend from the outside drums 28 and 28' of the two pairs, and paired cables 27 and 27' extend from the inside drums of the two pairs. The pairs of cables at each side of the body extend over suitable guides g that direct them into the open forward ends of the corresponding channeled guides 25 that extend rearwardly along the top corner edges of the truck body 10. The four cables extend in their respective guide channels 25 to the rear end of the body and are there connected, as presently explained, to upper end portions of the hangers 23 of the can loading platform.

It is further to be understood that the drums of each pair have pawl and ratchet driving connections with their mounting shaft 30, as seen in FIG. 4a, which shows paired, oppositely arranged ratchet wheels R fixed to the shaft 30 and pawls P correspondingly thereto mounted on the drum ends to engage therewith. The pawl and ratchet driving arrangement is such that when shaft 30 is driven in one direction it rotates the outside drums 28 and 28' in such direction as to wind their cables 26 and 26' inwardly thereon while the other drums are free to pay out their cables 27 and 27'. Then when shaft 30 is driven in an opposite direction, the direction of the winding is reversed to wind in cables 27–27′ and pay out the cables 26–26′.

The paired cables 26 and 26′ extend rearwardly from their drums 28–28′ within the corresponding guide rails 25—25 and at the rear end of the vehicle are directed diagonally, as shown in FIG. 6, and are attached at their ends to the top ends of the hangers 23—23 mounted at the rear end corners of the platform structure 15. Likewise the paired cables 27–27′ extend rearwardly within the guide rails 25 and directly downwardly from their rear ends to pass below and then upwardly about rollers 24x that are mounted on the lowered end portions of the rails 25 below the upper end level of the cans, as shown in FIGS. 6 and 6a, and at their ends are attached to the spindles of the rollers 24 mounted on the hangers 23 at the inner edge corners of the can carrier structure.

This arrangement of cables provides that, starting with the platform in the normal horizontal position of FIG. 6, the initial winding in of cables 26 and 26′ for lifting and dumping a load results in the can carrier structure 15 being tilted forwardly to the dash line position of 15a in FIG. 2 and cause the guide rollers 24 of the two rear hangers to seat in the guide channels 25 as at point 25e in FIG. 6. Then, continued inwinding of cables 26—26′ lifts the platform structure 15, causing the rollers 24 at the top ends of the rear corner hangers 23 to swing arcuately in an upward and forward direction and be received in the open rear edges of the guide ways 25, and thence to be lifted and moved forwardly across the top wall of the vehicle to the can dumping position at 15b in FIG. 2. During this forward travel of the cans and platform, the cables 27–27′ are being paid out from their drums, and drawn upwardly at their rear ends about the sheaves 24x with the can carrier structure 15 as drawn along the guide rails 25.

In the advancement of the inverted platform structure 15 along the top of the body 10, it ultimately engages at its lower forward edge against a slidably mounted cover plate 31 applied over the refuse receiving top opening 31x of the body and pushes it against pressure of springs 31S contained in the guide channels 25 to the open position in which it is shown in FIG. 1a. Coincident with the engagement of the plate 31 and its movement to open position, the can cover plate 22 of the platform structure simultaneously engages stops 25x shown in FIG. 1a that are disposed in or adjacent to the guide channels and is thereby checked against advancement with the platform and the inverted cans are permitted as they pass over the top opening 31x of the body to discharge their contents into the body.

With the subsequent rearward or return movement of the platform frame 15 after dumping to loading position as effected by a reversal in direction of driven shaft 30, the cover plate 31 will be actuated by spring means 31S, shown in FIG. 1a to its normally closed position over the body opening 31x and the can cover plate 22 will be returned by the frame structure 15 to assume its normal can covering position. With the return of the platform structure 15 to the rear end of the truck by winding in of cables 27–27′, it is automatically returned under its own weight, through its position of 15a to its loading position of FIG. 8 as the lifting cables 26 and 26′ are fully paid out from their winding drums 28 and 28′.

The cross-shaft 30 which mounts the cable winding drums 28–28′ and 29–29′ is rotatably supported across the top of the body 10 forwardly of end wall 10f as indicated in FIG. 9, and is adapted to be driven as in FIG. 9 by a shaft 47d which has a geared connection therewith at its upper end, as designated at 47e.

At its lower end shaft 47d has a driving gear 47g which may be selectively engaged by and disengaged from a gear 50, as presently explained, to drive the drums for lifting or lowering the platform structure 15 for can dumping and returning to loading position after dumping.

Garbage or refuse deposited in the forward end of the body 10 may be compressed, as occasion arises, in the closed or rear end portion of the body 10 by the compressing action of a press plate or bulk head 40 that is normally supported, preferably in an upwardly and forwardly inclined position, transversely of and within the forward end portion of the body, as shown in FIG. 2. This plate 40 is supported and actuated by four horizontally mounted, threaded shafts 45 that are contained longitudinally within the body 10 in the relationship shown in FIG. 9 and extend rearwardly substantially to its full length. All shafts 45 are rotated through the mediacy of shafts 47 that radiate from a bearing member 48 that mounts the drive shaft 49 of the central driving gear 50; each shaft 47 being rotatably mounted at its inner end in bearing portions 50′ of the fixed bearing member 48 and at their outer ends are revoluble in supporting, self aligning bearing members 47x of special formation, as shown in FIG. 9. Relatively small diameter bevel gears 51 of like diameter, are fixed to the inner ends of the shafts 47 in mesh with gear 50 and are equipped at their outer ends with bevel gears 52 that are in operative mesh with bevel gears 53 fixed on the corresponding threaded shafts 45. The main drive shaft 49 is revolubly mounted in the front and rear fixed bearings 48 and is selectively driven by a reversible power take off connection with the drive shaft of the truck engine, not shown.

Shaft 49 is rotatably supported near gear 50 by a bearing block 58 as seen in FIG. 10 which block is bolted to the frame of the truck. This shaft is keyed in and drives the two faced bevel gear 50 mounted thereon as in FIG. 10. The gear is shiftable of shaft 49 for selectively driving the gears 52 which drive the packing plate driving shafts 45 or the driving gears 47g of shaft 47d to actuate the loading platform.

The shifting means for gear 50 comprises a pair of parallel rods 60—60 that extend horizontally and slidably through the adjacent bearing 48 whereby the shaft 49 is mounted. These rods have rearward ends secured in a shifting collar associated with gear 50 as in FIGS. 9 and 10 and extends forwardly therefrom and are joined by a cross-bar 61 which is actuated by a conventional shift lever 62.

The press plate 40 whereby the refuse, as collected in the body 10 is to be compressed, is supported by the threaded shafts 45 as arranged in FIGS. 9 and 10.

It is shown in FIG. 5 that the threaded shafts 45 mount sleeves 85 thereon and these move forwardly with the rotation of the shafts in one direction and rearwardly with their rotation in the opposite direction. The sleeves are attached to the plate 40 as in FIG. 5 and the plate is moved thereby. Directional control of shafts 45 is through directional control of drive shaft 48 through the power take off means, not shown.

A feature of the truck body of FIG. 2 resides in the upward cylindrical curvature of the lower part of closure 12. This curvature, and the inclined position of the press plate 40 causes an upward lifting of the garbage as packed in the rear of the body.

What I claim is:

1. A refuse collecting vehicle having a hollow body with a refuse receiving opening in its top wall, a platform structure normally horizontally suspended at the rear end of said body, means for the removable securement of garbage containing cans on said platform structure in upright position, a cover plate for said secured cans shiftably mounted by said platform structure for movement from and over said cans, a trackway fixed to said body and extending upwardly at its rear end and thence forwardly across and beyond said receiving opening, means mounting said platform structure for its travel along said trackway, powered means for initially moving the platform structure and cans secured thereon upwardly along the trackway and causing their inversion on their forward travel for the discharge of the contents of the cans into the body through the receiving opening and for then returning the platform structure and emptied cans to normal position at the rear end of the body, and a stop fixed on the body engagable by said can cover plate incident to the forward movement of the platform structure across said body opening to cause said cover plate to be shifted to can uncovering position upon their reaching the discharge position.

2. The combination recited in claim 1 wherein said trackway comprises two laterally spaced inwardly facing channeled guide rails and said platform structure comprises a bottom plate on which said garbage can may be placed and fixedly supported, hangers rigidly fixed to the platform structure at opposite ends thereof and equipped at upper ends with rollers adapted for guided travel in the laterally spaced channels, and wherein the powered means for lifting and moving the platform structure comprises a pair of cable winding drums associated with each channel at its forward end, and paired cables extending from companion drums in and along said channels and connected with said hangers, one pair of cables being operable to lift and move the platform structure for the inversion and emptying of cans placed thereon and the other pair being operable to return the platform to initial position after the can emptying operation.

3. A combination according to claim 2 wherein the winding of cables on one pair of drums effects the drawing out of the cables from the other pair of drums, and wherein said bottom plate of said platform structure is pivotally supported at its inner edge by said hangers, and the winding in of the platform lifting cables effect the upward tilting of the platform structure and the can supporting plate to vertical position and for holding the hangers in position for entry of the rollers at their ends into and for travel along the channeled guide rails to and from the can discharge position.

4. A combination according to claim 3 wherein the hollow body has an open rear end fitted with a hingedly mounted upwardly opening closure, from which said platform structure is normally suspended and which closure, in its opening, moves said platform structure clear of said open rear end, and wherein, said body is provided with an internal refuse press plate operable rearwardly from forwardly of said receiving opening for the compacting of collected material and for its ejection from the body when said closure is open.

5. A combination according to claim 4 wherein the said body is of rectangular cross-section and said rear end closure is of semi-cylindrical formation and disposed horizontally, thus to cause material, as compacted thereagainst by said press plate to be caused to be moved upwardly therealong toward the top wall of the body.

References Cited by the Examiner

UNITED STATES PATENTS

| | | | |
|---|---|---|---|
| 576,727 | 2/1897 | Healy | 214—303 |
| 1,195,245 | 8/1916 | Lowes et al. | 214—307 X |
| 1,775,726 | 9/1930 | Knigge | 214—302 X |
| 1,919,096 | 7/1933 | Drewry | 214—313 |
| 2,808,158 | 10/1957 | Gilleo | 214—82 |
| 2,826,318 | 3/1958 | Beasley | 214—83.3 |
| 2,831,590 | 4/1958 | Greenfield et al. | 214—302 |
| 2,906,419 | 9/1959 | Visco et al. | 214—302 |
| 2,961,105 | 11/1960 | Shubin | 214—83.3 |
| 3,012,813 | 12/1961 | Reese | 214—303 X |
| 3,062,394 | 11/1962 | Bowles | 214—83.3 |

GERALD M. FORLENZA, *Primary Examiner.*